UNITED STATES PATENT OFFICE.

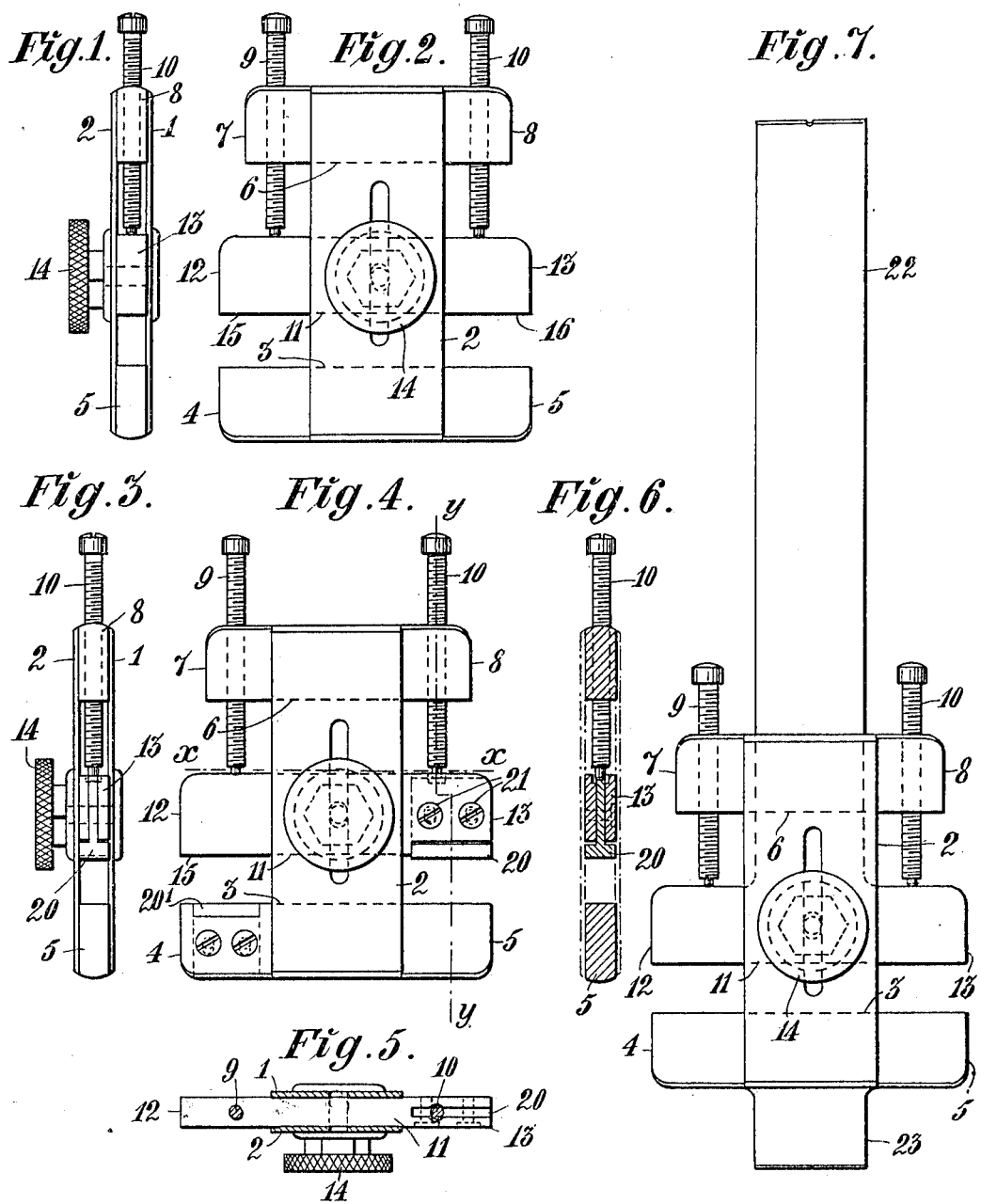

CARL EDWARD JOHANSSON, OF ESKILSTUNA, SWEDEN.

GAGE FOR OUTSIDE OR INSIDE MEASUREMENTS.

949,276.  Specification of Letters Patent.  Patented Feb. 15, 1910.

Application filed July 3, 1907. Serial No. 382,091.

*To all whom it may concern:*

Be it known that I, CARL EDWARD JOHANSSON, a subject of the King of Sweden, and resident of Eskilstuna, in the Kingdom of Sweden, have invented new and useful Improvements in Gages for Outside or Inside Measurements, of which the following is a specification, reference being had to the drawing accompanying and forming a part hereof.

This invention relates to gages for outer or inner measurements.

In the instruments of this kind hitherto employed the movable measuring member cannot be reliably secured in such a manner that the adjusted distance of its measuring surface from the measuring surface of the fixed measuring member will remain constant, during measuring, and the measuring surfaces will be held parallel to each other. In most cases the movable measuring member is secured in position merely by a set screw, or the like, whereby, on account of the play always existing between the movable measuring member and its guide, a small turning of the movable measuring member is not avoided.

The object of this invention is to remove the said drawback and provide a gage in which the adjustable measuring member can be positively secured, after adjustment, in an absolutely fixed position in relation to the fixed measuring member.

The invention consists, chiefly, in mounting the movable measuring member between two fixed cross-heads, one of which is provided with axially extending set screws adapted to be screwed on to the movable measuring member. The latter may be secured in position in any suitable way, for instance by a set screw, or the like, as hitherto usual, whereupon the stop screws are screwed on to the secured measuring member so that any turning of the movable measuring member about the point of contact of the set screw therewith is positively prevented.

In the drawings, I have shown, by way of example, some embodiments of the invention. Figs. 1 and 2 are side and front views respectively, of a gage for outside measurements. Figs. 3 and 4 are side and front views respectively of a similar gage provided with means for adjusting the allowance or amount of variation to be admitted. Figs. 5 and 6 are sections, on lines *x—x* and *y—y*, respectively, of Fig. 4. Fig. 7 shows a combined gage for outside and inside measurements.

Corresponding parts in the several figures of the drawings are designated by the same reference characters.

Referring to Figs. 1 and 2, the gage comprises a frame consisting of two side-pieces 1 and 2, and two fixed cross-heads, viz. one cross-head 3 having two laterally projecting ends 4 and 5 forming the fixed jaws or measuring members of the gage, and one cross-head 6 having, likewise, two laterally projecting ends 7 and 8. Set-screws 9 and 10, respectively, are mounted at each end of the cross-head 6, and are adapted to be screwed into contact with a cross-piece 11 adjustably secured to the frame of the gage and having two laterally projecting ends 12 and 13 forming the movable jaws or measuring members of the gage. The adjustable cross-piece 11 is secured in position by a nut or clamping-screw 14. The jaws 12 and 13 of the cross-piece 11 have on the side facing the jaws 4 and 5, flat measuring surfaces 15 and 16 parallel to each other, one of the said measuring surfaces lying somewhat in front of the other, say 0.05 mm. according to the allowance or amount of variation of measurement to be admitted. By means of extra cross-pieces having the measuring surfaces arranged at different intervals the adjustable gage may be changed for a different allowance.

The adjustable gage for outside measurements shown in Figs. 3 to 6 is provided with means enabling the allowance to be varied. To this end a part 20 is adjustably mounted in a recess in the cross-piece 11, said part being secured in position by clamping screws 21 or other suitable means. The set screw 10 suitably abuts against the one side of the part 20, thus affording a further support for the latter. In order to enable the end of the set screw 10 to freely enter the recess in the cross-piece, the parts of the sides of the recess adjacent to the screw may be hollowed corresponding to the shape of the screw. By this construction the recess need not be made so wide as otherwise would be necessary.

Instead of mounting the adjustable part in the movable measuring member, as shown in the right handside of Fig. 4, said part may, if desired be mounted in the fixed measuring member, as shown at 20' in the left handside of Fig. 4.

The embodiment of the invention shown in Fig. 7 forms a combined gage for ascertaining both outside and inside measurements. The adjustable part 11 of the gage has a rearward extension 22, passing through a corresponding hole in the cross-head 6. The other cross-head 3 of the gage has an extension 23 projecting beyond the side-pieces of the frame while the corresponding sides of the ends 4 and 5 of the cross-head 3 are substantially in line with the corresponding edges of the side-pieces.

Having now described my invention, what I claim as new and desire to secure by Letters Patent is:

1. In a gage, the combination of a frame comprising two cross-heads connected to each other, a movable measuring member slidably supported between the said cross-heads, and stop screws inserted through one of the said cross-heads and adapted to be screwed on to the movable measuring member, substantially as and for the purpose set forth.

2. In a gage, the combination of a frame comprising two cross-heads connected to each other, one of said cross-heads forming a stationary measuring member having two measuring surfaces, a movable measuring member slidably supported between the said cross-heads, and stop screws inserted through one of the said cross-heads and adapted to be screwed on to the movable measuring member, substantially as and for the purpose set forth.

3. In a gage, the combination of a frame comprising two cross-heads connected together by side-pieces, a movable measuring member inserted between the said side pieces, and stop-screws inserted through one of the said cross-heads and adapted to be screwed on to the movable measuring member, substantially as and for the purpose set forth.

4. In a gage, the combination of a frame comprising two cross-heads connected to each other, one of said cross-heads forming a fixed measuring member, a movable measuring member slidably supported between the said cross-heads, a measuring part adjustably mounted in one of the said measuring members, means for holding the said adjustable measuring part in adjusted position, and stop screws inserted through one of the cross-heads, said stop screws being adapted to be screwed on to the movable measuring member, substantially as and for the purpose set forth.

5. In a gage, the combination of a frame comprising two cross-heads connected to each other, a movable measuring member slidably supported between the said cross-heads, a measuring part adjustably mounted in a recess in the movable measuring member, means for holding the said adjustable measuring part in adjusted position, and stop screws inserted through one of the said cross-heads, said stop screws being adapted to be screwed on to the movable measuring member and to the measuring part mounted therein, respectively, substantially as and for the purpose set forth.

6. In a gage, the combination of a frame comprising two cross-heads connected to each other, one of said cross-heads forming a fixed measuring member having a backward extension, a movable measuring member slidably supported between the said fixed measuring member and the other cross-head, said movable measuring member having a backward extension passing through an opening in the said latter cross-head, said extension of the movable measuring member having a measuring surface adapted to coöperate with a measuring surface at the extension of the fixed measuring member, and stop screws inserted through holes in the cross-head embracing the extension of the movable measuring member, said stop screws being adapted to be screwed on to the said movable measuring member, substantially as and for the purpose set forth.

In testimony whereof I have signed my name to this specification in the presence of two subscribing witnesses.

CARL EDWARD JOHANSSON.

Witnesses:
KARL RUNCSKOG,
AUGUST SÖRENSON.